(12) United States Patent
Bandaru et al.

(10) Patent No.: US 12,112,154 B2
(45) Date of Patent: Oct. 8, 2024

(54) AUTOMATED SOFTWARE DEPLOYMENT TECHNIQUES

(71) Applicant: Dell Products L.P., Round Rock, TX (US)

(72) Inventors: Nagendra Gupta Bandaru, Bangalore (IN); Ronika Das, South Delhi (IN); Carlos Eduardo De Oliveira Maciel, Lago Vista, TX (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 17/831,827

(22) Filed: Jun. 3, 2022

(65) Prior Publication Data
US 2023/0393825 A1 Dec. 7, 2023

(51) Int. Cl.
*G06F 9/44* (2018.01)
*G06F 8/60* (2018.01)
*G06F 8/71* (2018.01)
*G06F 8/75* (2018.01)

(52) U.S. Cl.
CPC .............. *G06F 8/60* (2013.01); *G06F 8/71* (2013.01); *G06F 8/75* (2013.01)

(58) Field of Classification Search
None
See application file for complete search history.

(56) References Cited

U.S. PATENT DOCUMENTS

| | | | | |
|---|---|---|---|---|
| 10,768,929 B1 * | 9/2020 | Turner | | G06F 8/38 |
| 11,544,050 B1 * | 1/2023 | Ankit | | G06F 11/3668 |
| 11,586,437 B1 * | 2/2023 | Tripp | | G06F 9/54 |
| 2005/0080801 A1 * | 4/2005 | Kothandaraman | | H04L 67/02 |
| 2016/0026452 A1 * | 1/2016 | Dani | | G06F 8/71 |
| | | | | 717/170 |
| 2019/0250949 A1 * | 8/2019 | Chen | | H04L 43/062 |
| 2020/0210325 A1 * | 7/2020 | Allweil | | G06F 11/3688 |

(Continued)

OTHER PUBLICATIONS

Metadata API Developer Guide: Version 55.0, Summer '22, Salesforce, Inc. (available at: https://resources.docs.salesforce.com/238/latest/en-us/sfdc/pdf/api_meta.pdf, last accessed Jun. 3, 2022), last updated May 26, 2022, pp. 1-132.

*Primary Examiner* — Ted T. Vo
*Assistant Examiner* — Lanny N Ung
(74) *Attorney, Agent, or Firm* — Ryan, Mason & Lewis, LLP (57) ABSTRACT

Methods, apparatus, and processor-readable storage media for automated software deployment are provided herein. An example computer-implemented method includes obtaining at least one request to merge one or more code changes associated with a first branch of software code with a second branch of software code; performing one or more tests to validate the at least one request; in response to validating the request, performing a merge operation that merges the one or more code changes with the second branch of software code; and deploying the second branch of software code to at least one cloud-based computing environment based at least in part on a version tag that identifies the merge operation corresponding to the request and a previous version tag that identifies a most recent merge operation completed for a previously deployed version of the second branch of software code.

20 Claims, 9 Drawing Sheets

(56) References Cited

U.S. PATENT DOCUMENTS

| | | | |
|---|---|---|---|
| 2021/0255854 A1* | 8/2021 | Coscarelli | G06F 11/362 |
| 2021/0326353 A1* | 10/2021 | Poetter | G06F 16/2282 |
| 2022/0131865 A1* | 4/2022 | Lev Ran | H04L 41/0869 |
| 2022/0391311 A1* | 12/2022 | Zhang | G06F 11/3684 |

* cited by examiner

AUTOMATED SOFTWARE DEPLOYMENT TECHNIQUES

FIELD

The field relates generally to information processing systems, and more particularly to software deployment techniques in such systems.

BACKGROUND

Cloud-based solutions are increasingly being used by enterprises to simplify and shorten the software development lifecycle. For example, cloud-based customer relationship management (CRM) platforms (such as the Salesforce® CRM platform) provide a variety of features and tools for application development. Such platforms are often limited when deploying large applications that require fast migration and delivery of software code to multiple environments. For example, some options on such platforms may be inefficient due to a lack of version control, package size constraints, and/or rollback processes.

SUMMARY

Illustrative embodiments of the disclosure provide automated software deployment techniques. An exemplary computer-implemented method includes obtaining at least one request to merge one or more code changes associated with a first branch of software code with a second branch of software code; performing one or more tests to validate the at least one request; in response to validating the request, performing a merge operation that merges the one or more code changes with the second branch of software code; and deploying the second branch of software code to at least one cloud-based computing environment based at least in part on a version tag that identifies the merge operation corresponding to the request and a previous version tag that identifies a most recent merge operation completed for a previously deployed version of the second branch of software code.

Illustrative embodiments can provide significant advantages relative to conventional software deployment techniques. For example, technical problems associated with deploying large applications to cloud-based computing environments are mitigated in one or more embodiments by reducing the size of deployment packages by tagging specific commits, while also integrating quality checks before merging code changes. Some embodiments also enable complete rollback support, and provide improved tools for retrofitting code and for communicating issues to developers.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

The term DevOps (development and operations) generally refers to a set of practices that combines software development and information technology (IT) operations. DevOps are increasingly being used to shorten the software development lifecycle and to provide continuous integration, continuous delivery, and continuous deployment. Continuous integration generally allows development teams to merge and verify changes more often by automating software builds (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment allows code changes that pass the automated testing phase to be automatically released into the production environment, thus making the changes visible to the end users. Such processes are typically executed within the build and deployment pipeline. Conventional cloud-based platforms often deploy the software code present in the release branch to testing and production environments in its entirety, even if the code was not modified in the current release. This increases the package size and results in longer execution times, which in turn reduces the frequency with which software deployments can occur. Such approaches can also increase the risk of making erroneous changes to files. Additionally, there is often a lack of quality checks (e.g., quality gates) before the code changes of a given developer are merged to a release branch. Deployment errors can be caused, for example, due to developers failing to synchronize changes of a particular release to the higher release branches, which can lead to missing or incorrect code across the environments. Such issues often need to be manually reviewed to identify and notify the developers that committed the changes.

Some cloud-based platforms allow a partial rollback of code changes to be performed if a developer manually commits the previous code to the branch. However, a complete rollback is challenging as each developer needs to individually commit the previous changes to the branch.

One or more embodiments described herein provide improved DevOps tools that can achieve continuous integration, continuous delivery, and continuous software deployments for enterprise software development. Such embodiments can reduce deployment execution time and deployment errors relative to conventional approaches. At least some embodiments also provide improved communication tools and enable complete rollbacks of software deployments to be performed in an automated manner.

Figure 1:
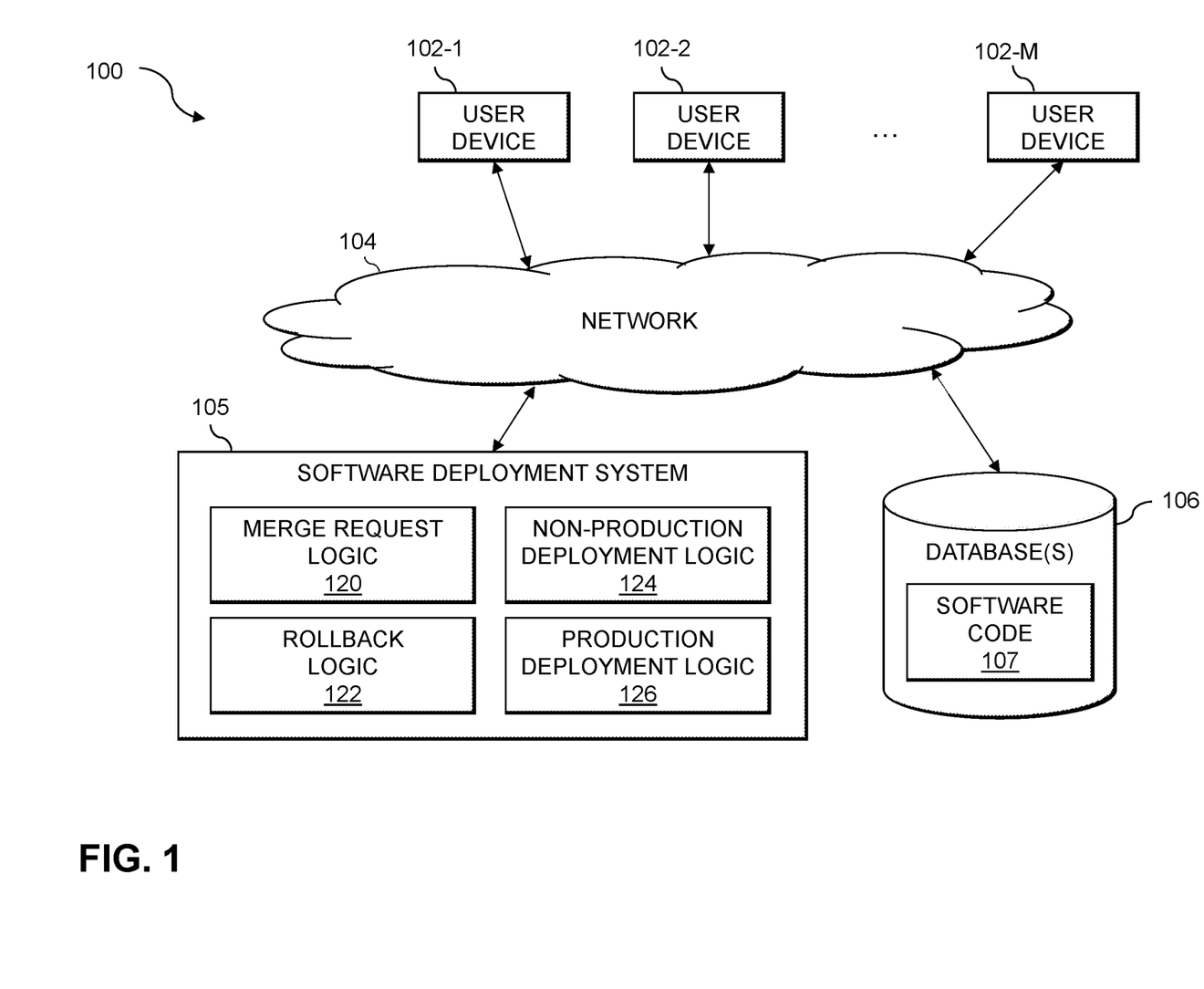
FIG. 1 shows an information processing system configured for automated software deployment in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software deployment system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the software deployment system 105 can have at least one associated database 106 configured to store data pertaining to, for example, software code 107 of at least one application. For example, the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments).

Also, at least a portion of the one or more user devices 102 can also have at least one associated database (not explicitly shown in FIG. 1). As an example, such a database can maintain a particular branch of the software code 107 that is developed in a sandbox environment associated with a given one of the user devices 102. Any changes associated with that particular branch can then be sent and merged with branches of the software code 107 maintained in the at least one database 106, for example. An example database 106, such as depicted in the present embodiment, can be implemented using one or more storage systems associated with the software deployment system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software deployment system 105 are one or more input-output devices, which illustratively comprise keyboards, displays or other types of input-output devices in any combination. Such input-output devices can be used, for example, to support one or more user interfaces to the software deployment system 105, as well as to support communication between software deployment system 105 and other related systems and devices not explicitly shown.

Additionally, the software deployment system 105 in the FIG. 1 embodiment is assumed to be implemented using at least one processing device. Each such processing device generally comprises at least one processor and an associated memory, and implements one or more functional modules for controlling certain features of the software deployment system 105.

More particularly, the software deployment system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software deployment system 105 to communicate over the network 104 with the user devices 102, and illustratively comprises one or more conventional transceivers.

The software deployment system 105 further comprises merge request logic 120, rollback logic 122, non-production deployment logic 124, and production deployment logic 126. Exemplary processes utilizing elements 120, 122, 124, and 126 will be described in more detail with reference to, for example, the flow diagrams of FIGS. 3 through 6.

It is to be appreciated that this particular arrangement of elements 120, 122, 124, and 126 illustrated in the software deployment system 105 of the FIG. 1 embodiment is presented by way of example only, and alternative arrangements can be used in other embodiments. For example, the functionality associated with the elements 120, 122, 124, and 126 in other embodiments can be combined into a single module, or separated across a larger number of modules. As another example, multiple distinct processors can be used to implement different ones of the elements 120, 122, 124, and 126 or portions thereof.

At least portions of elements 120, 122, 124, and 126 may be implemented at least in part in the form of software that is stored in memory and executed by a processor.

It is to be understood that the particular set of elements shown in FIG. 1 for software deployment system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software deployment system 105 and database(s) 106 can be on and/or part of the same processing platform.

An exemplary process utilizing at least a portion of elements 120, 122, 124, and 126 of an example software deployment system 105 in computer network 100 will be described in more detail with reference to, for example, the flow diagram of FIG. 7.

Figure 2:
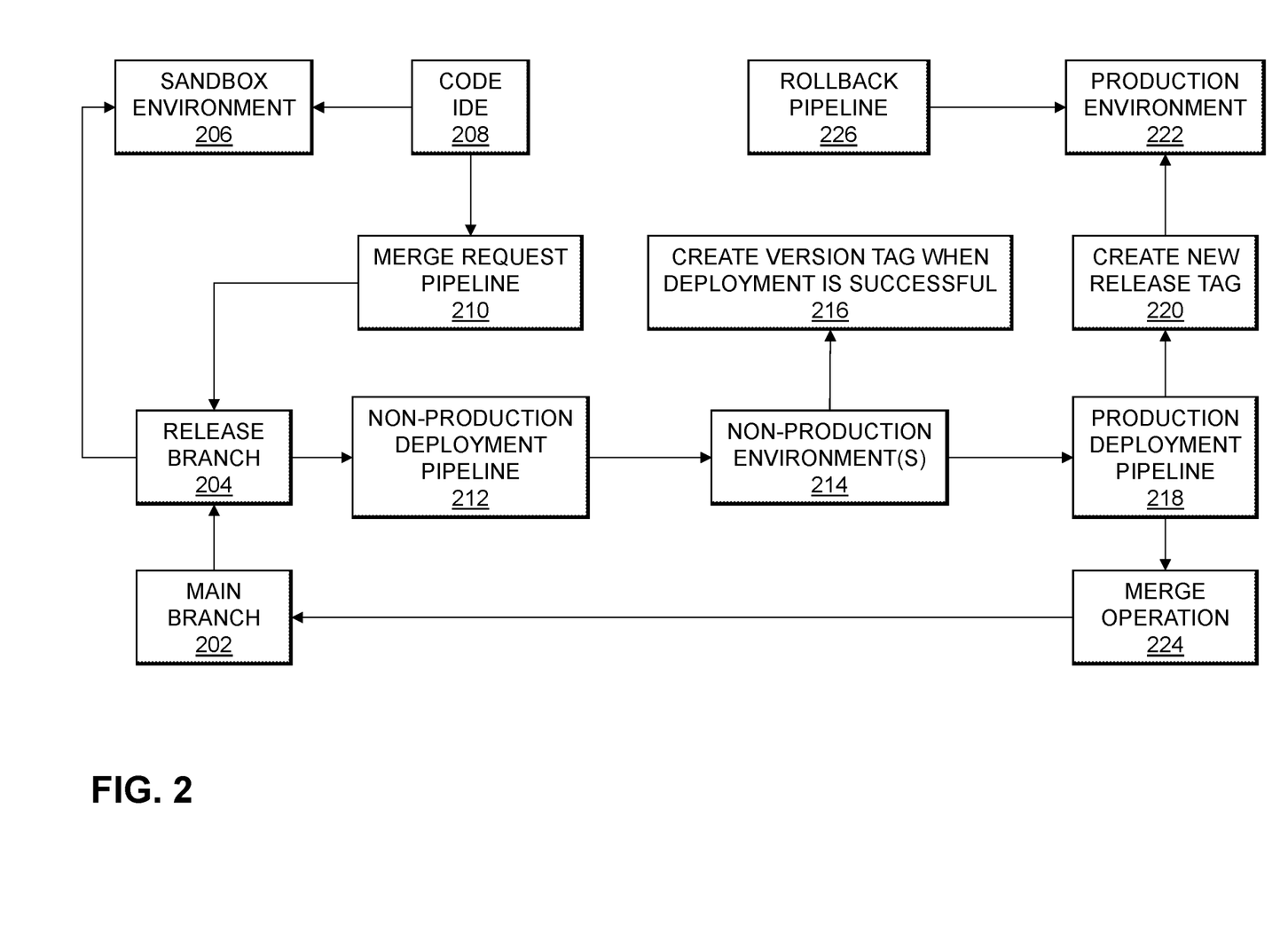
FIG. 2 shows an example of a system workflow in an illustrative embodiment.

FIG. 2 shows an example of a system workflow in an illustrative embodiment. In the FIG. 2 example, a main branch 202 corresponds to software code of at least one software application. A release branch 204 is created based on the main branch 202. For example, the release branch 204 may be created based on development release timelines corresponding to the software application. In some embodiments, it is assumed that each release branch 204 that is created is marked with a version zero tag, indicating that it is the start of the release.

One or more developers (e.g., corresponding to user devices 102) create respective personal branches based on the release branch 204, and perform development work using a sandbox environment 206 and a code IDE (integration development environment) 208. As a non-limiting example, the software branches can be implemented as Git branches and the sandbox environment 206 can correspond to a Salesforce® developer sandbox environment. Accordingly, developers can develop code using a combination of Git and Salesforce Development Experience (SFDX) commands along with the code IDE 208 in respective developer sandboxes. Developers can submit merge requests to commit the changes made in their personal branches to the release branch 204. When a merge request is submitted, a merge request pipeline 210 is triggered. Generally, the merge request pipeline 210 validates and tests the changes corresponding to the merge request, and can possibly generate one or more approval requests related to the changes, as described in more detail in conjunction with FIG. 3, for example. When the merge request is validated and/or approved, the changes are automatically merged to the release branch 204.

In the FIG. 2 example, a non-production deployment pipeline 212 is triggered according to one or more specified schedules. The non-production deployment pipeline 212 deploys any changes resulting from the change requests to one or more non-production environments 214. Step 216 includes creating a version tag when the non-production deployment is successful.

In some examples, the non-production environment(s) 214 may include one or more of: a developer integration testing (DIT) environment, a system integration testing (SIT) environment, and a global environment. As noted above, the non-production deployment pipeline 212 may be triggered according to schedules defined for each of the non-production environments 214 (e.g., every hour for a DIT environment and every four hours for a SIT environment). An example of a non-production deployment pipeline 212 is described in more detail in conjunction with FIG. 4, for example.

A production deployment pipeline 218 can be triggered when the release branch 204 of the application is ready to be deployed to a production environment 222. Generally, the production deployment pipeline 218 collects any changes that were made to the release branch 204, creates a deployment package, and deploys the package to the production environment 222. A new release tag 220 is also created and assigned to the branch of code that was released to the production environment 222. A merge operation 224 is performed to update the main branch 202 to the latest software code that was deployed to the production environment 222. An example of a production deployment pipeline 218 is described in more detail in conjunction with FIG. 5, for example.

The FIG. 2 example also includes a rollback pipeline 226. The rollback pipeline 226 enables a complete rollback of the package that is deployed to the production environment 222 to a previous version. The rollback pipeline 226 performs the rollback based at least in part on the new release tag 220, and possibly other release tags that were previously created for previous packages that were deployed to the production environment 222, as described in more detail in in conjunction with FIG. 6, for example.

Figure 3:
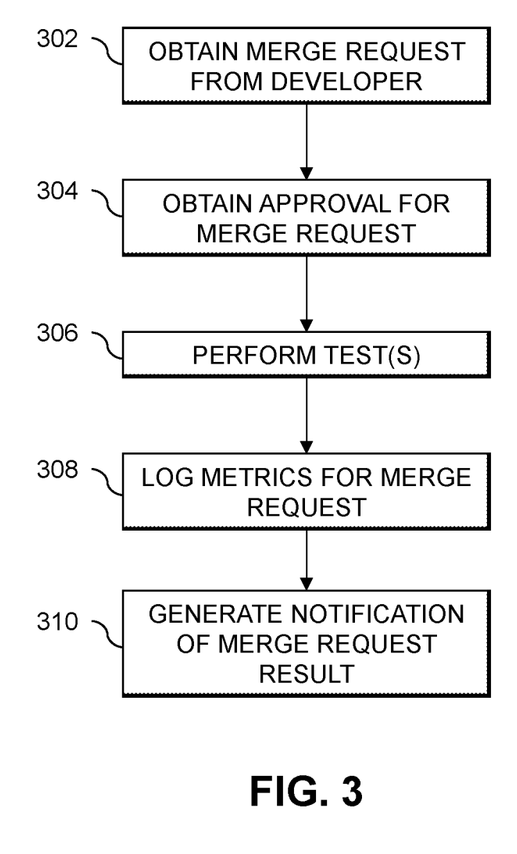
FIG. 3 shows an example of a merge request process in an illustrative embodiment.

FIG. 3 shows an example of a merge request process in an illustrative embodiment. It is to be understood that this particular process is only an example, and additional or alternative processes can be carried out in other embodiments. In this embodiment, the process includes steps 302 through 310. These steps are assumed to be performed by the software deployment system 105 utilizing at least in part merge request logic 120.

Step 302 includes obtaining a merge request from a developer. The merge request, in some embodiments, specifies the target branch, and possibly one or more other users (e.g., team leaders) for approving the merge request. As an example, a system can be configured so that each merge request needs to satisfy some approval criteria, such as an approval from a team lead and an approval from a security approver.

Step 304 includes obtaining approval for the merge request. For example, a notification (e.g., an email) can be sent to the team lead specified in the merge request. Alternatively, or additionally, a notification is sent to a security approver to provide approval for any profiles and/or permission set components related to the components, which act as an access control mechanism. If the changes do not modify profile or permission set files, then a service account can automatically provide the approval in at least some embodiments. The merge request can then get merged to the release branch once the team lead approves the same.

Step 306 includes performing one or more tests to validate the changes associated with the merge request. For example, the tests can validate the submitted changes against a DIT environment of the release branch. If changes are made to one or more software classes (e.g., Apex classes), then test class methods can also be executed. Accordingly, this enables the changes of the merge request to be validated against the changes of other developers in the environment. This allows issues and/or errors to be addressed at an early stage.

Step 308 includes logging metrics associated with the merge request. For example, the information may include at least one of: a status of validation, an error list (if any), a source and target branch, and an execution time. In at least some embodiments, this information is stored in a DevOps sandbox environment.

Step 310 includes generating a notification of the merge request result. For example, a notification (e.g., an email) can be sent to the developer. The notification can include details of the validation status on whether the merge request failed or succeeded. If the merge request failed, then the notification can also include a corresponding error list.

Accordingly, such a process enables quality checks to be added at the merge request level. Thus, as developers submit merge requests to merge code changes to a release branch, the changes can be validated in a testing environment (e.g., a DIT environment) of the release against the changes from other developers.

Figure 4:
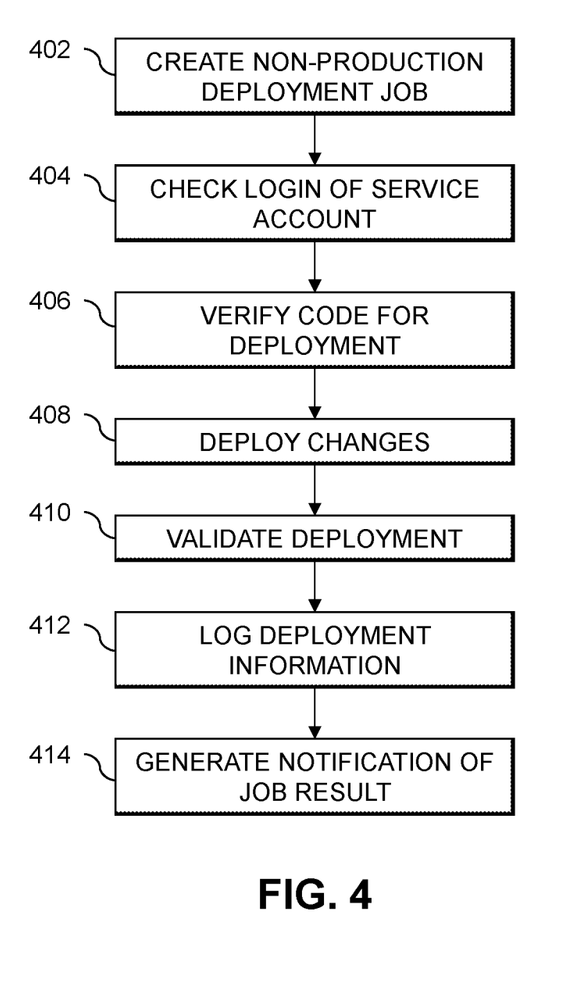
FIG. 4 shows an example of a non-production deployment process in an illustrative embodiment.

FIG. 4 shows an example of a non-production deployment process in an illustrative embodiment. It is to be understood that this particular process is only an example, and additional or alternative processes can be carried out in other embodiments. In this embodiment, the process includes steps 402 through 414. These steps are assumed to be performed by the software deployment system 105 utilizing at least in part non-production deployment logic 124.

Step 402 includes creating a non-production deployment job. For example, step 402 can include collecting the changes from a previous version tag to a current version tag (created at step 216 in FIG. 2, for example).

Step 404 includes checking whether the service account is successfully able to login to the target environment. As an example, step 404 may include generating a token-based uniform resource locator (URL) using a combination of a user identifier and a password, which can be sent through an authentication stage job.

Step 406 includes verifying the code for deployment. For example, step 406 may include executing all tests configured for the branch in a DIT environment and/or a specific set of tests (e.g., tests present in a target folder of a DIT environment).

Step 408 includes deploying the changes to the environment (e.g., the DIT environment or the global environment). Step 408 can also include creating a version tag that references the last commit whose changes were deployed. If a deployment fails, a tag is not created.

Step 410 includes validating the deployment. For example, step 410 may include executing a set of testing scripts to be performed.

Step 412 includes logging the deployment information. For example, the deployment information can include collecting metrics in a similar manner as described above with respect to step 308, for example.

Step 414 includes generating a notification of the deployment job result. For example, the notification may indicate whether or not the deployment was successful. If the deployment failed, then the notification may be sent to the users that developed and/or committed the changes between the tags considered for the deployment.

In case of a deployment to a DIT environment, the changes that were made between a tag that was created for a previously successful deployment to the DIT environment and the latest commit on the branch can be collected to create the non-production deployment job at step 402.

For deployments to a global environment, the changes that were made between code corresponding to a tag that was created for a previously successful deployment to the global environment and the code corresponding to a tag that was created for a previously successful deployment to the DIT environment can be collected for deployment. As such, all changes being deployed to a global environment will have also been deployed in the DIT environment, which can help reduce the number of errors in the testing environment, for example.

By way of example, assume that the last tag created for a global environment (GE) deployment (GE-tag 1) references a first commit (commit 1), and the last tag for a DIT deployment (DIT-tag 1) references a second commit. The non-production pipeline for a deployment to the GE can include building a deployment job that packages the changes from GE-tag 1 to DIT-tag 1. In this way, the package size remains small, as the deployment job includes the incremental changes.

If the deployment job for the GE is successful, then the next version tag is created (GE-tag 2) which references the second commit (i.e., corresponding to the DIT-tag 1). Also, a notification can be generated indicating that the deployment was successful. In some examples, the notification may include information comprising one or more of: the target environment (which in this example would be GE), target branch, start time, end time, build time, and a list of users that performed commits since the last build or last successful build.

If the deployment fails, then a tag is not created. A notification can be generated to indicate the deployment failed, which can include similar information as the notification that is generated for a successful deployment. The notification may also include a list of errors and/or error messages, for example. For example, an error message can identify at least some of the following information: file name(s), line number(s), type(s) of error, and a user that committed the code.

Figure 5:
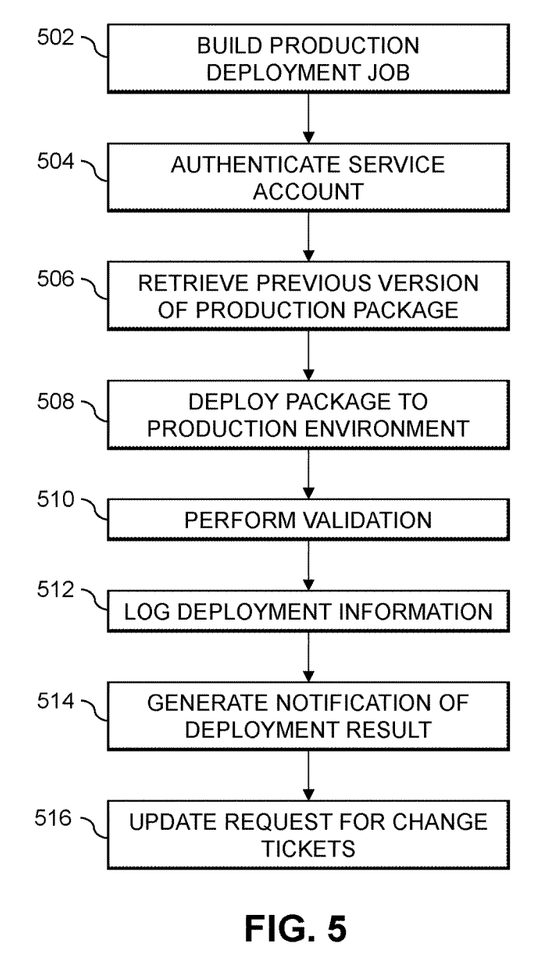
FIG. 5 shows an example of a production deployment process in an illustrative embodiment.

FIG. 5 shows an example of a production deployment process in an illustrative embodiment. It is to be understood that this particular process is only an example, and additional or alternative processes can be carried out in other embodiments. In this embodiment, the process includes steps 502 through 516. These steps are assumed to be performed by the software deployment system 105 utilizing at least in part production deployment logic 126.

Step 502 includes building a production deployment job. In some examples, step 502 can be triggered in response to a deployment version tag being created. For example, since production deployments are generally not performed on a daily basis, a user can create a next version tag, and step 502 can collect the changes from the starting commit of the branch or the previous version tag until the last commit on the branch. Accordingly, only the files that changed incrementally are included in the package.

Step 504 includes authenticating a service account, which can be performed in a similar manner as step 404.

Step 506 includes retrieving a previous version of a production package. For example, in some embodiments, retrieving the previous version can include retrieving backup code from the production environment using a package.xml file (which includes the list of files) and modifying it for the current deployment. The backup of the changes being deployed to the production environment are collected and saved in a rollback branch corresponding to the release (e.g., using one or more git commands). Accordingly, the previous version of the code from the production deployment can be stored for different releases (e.g., monthly, block, product integration test, and/or hotfix releases).

Step 508 includes deploying the package to the production environment.

Steps 510 through 514 are similar to steps 410 through 414.

Step 516 includes updating request for change (RFC) tickets based on the result of the deployment.

Figure 6:
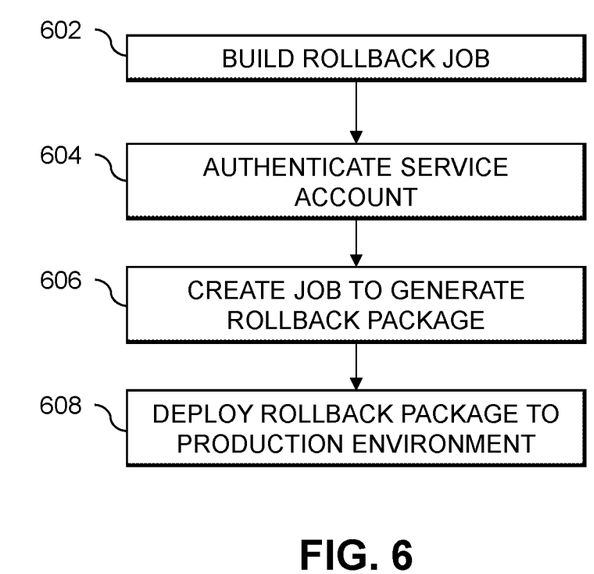
FIG. 6 shows an example of a rollback process in an illustrative embodiment.

FIG. 6 shows an example of a rollback process in an illustrative embodiment. In this embodiment, the process includes steps 602 through 608. These steps are assumed to be performed by the software deployment system 105 utilizing at least in part rollback logic 122.

In some embodiments, the rollback process can initially be executed in a pre-production environment that is similar to a production environment. If the process is successful in the pre-production environment, then the process can be executed in the production environment, if required.

Step 602 includes building a rollback job. For example, changes from the starting tag until the latest commit on the branch can be collected. Upon completion of the job, a file is created that identifies the names of files and components that will be deployed in the release. One example of such a file is a package.xml file, which contains a collection of metadata of components and identifies the components by their application programming interface (API) names. The package.xml file lists every component by type and includes corresponding metadata for each file.

Step 604 authenticates the service account in a similar manner as described above for step 404, for example.

Step 606 includes creating a job to generate a rollback package. The first time the job is executed, a previous version of a code deployed to the production environment is retrieved and stored in a particular folder (referred to as the rollback folder). The previous version of the code can be retrieved (e.g., using a retrieve command, such as an SFDX retrieve command) based on the file names and components listed in the package.xml file created in step 602, for example. Components and files identified in the package.xml file that were not retrieved indicate newly added components for the release which need to be removed to complete the rollback. Such components are added to a destructive changes file and a package file that are created and stored, e.g., in another folder (referred to herein as the destructive folder). The files, in some embodiments, can be .xml files. The rollback folder and the destructive folder are saved to the rollback branch associated with the release (e.g., using git commands).

Step 608 includes deploying the rollback package to the production environment. More specifically, the previous version of code stored in the rollback folder will be deployed to the production environment, and the destructive folder is used to delete newly added components of the release.

In at least some embodiments, a code retrofitting process is performed to help maintain synchronization of code in the production environment with code in one or more non-production environments. For example, a software script can be triggered (e.g., on a periodic basis such as daily, two times a day, etc.). Differences between a lower release branch and a higher release branch are identified along with the developers that committed the changes during the course of a release. The script generates and sends a link to a report (e.g., via email) to at least the identified developers. The developers can access the report in order to synchronize their respective changes to the higher release branches.

By way of example, the script can obtain a source branch, a target branch, and a list of higher branches other than the target branch. Differences between the source branch and the target branch are identified. The status (e.g., added, deleted, or modified) of the differences in each file are determined. For additions, a message is automatically generated to retrofit the code to higher branches, and the message is published to the report. For modifications, the differences in the file between the lower branch and higher branch are identified, which can be published to the report. For deletions, a message can be generated to retrofit the code to the target branch. Such a process can help avoid deployment errors resulting from missing or incorrect code across different environments as a result of unsynchronized changes.

Accordingly, one or more of the embodiments described herein increase the frequency of deployment and incremental changes of software code based at least in part on tags created in response to code changes deployed to one or more environments. For example, in some embodiments, when a deployment is successful, a tag is created with a reference to the last commit of which the changes were deployed. The tag can include the name of the developer that committed the changes and a version number. When the next deployment is performed, only the changes between the last tag and the current tag on the release branch need to be deployed. This can reduce the package size and increase the speed of the deployment, thus enabling developers to perform more frequent deployments.

Figure 7:
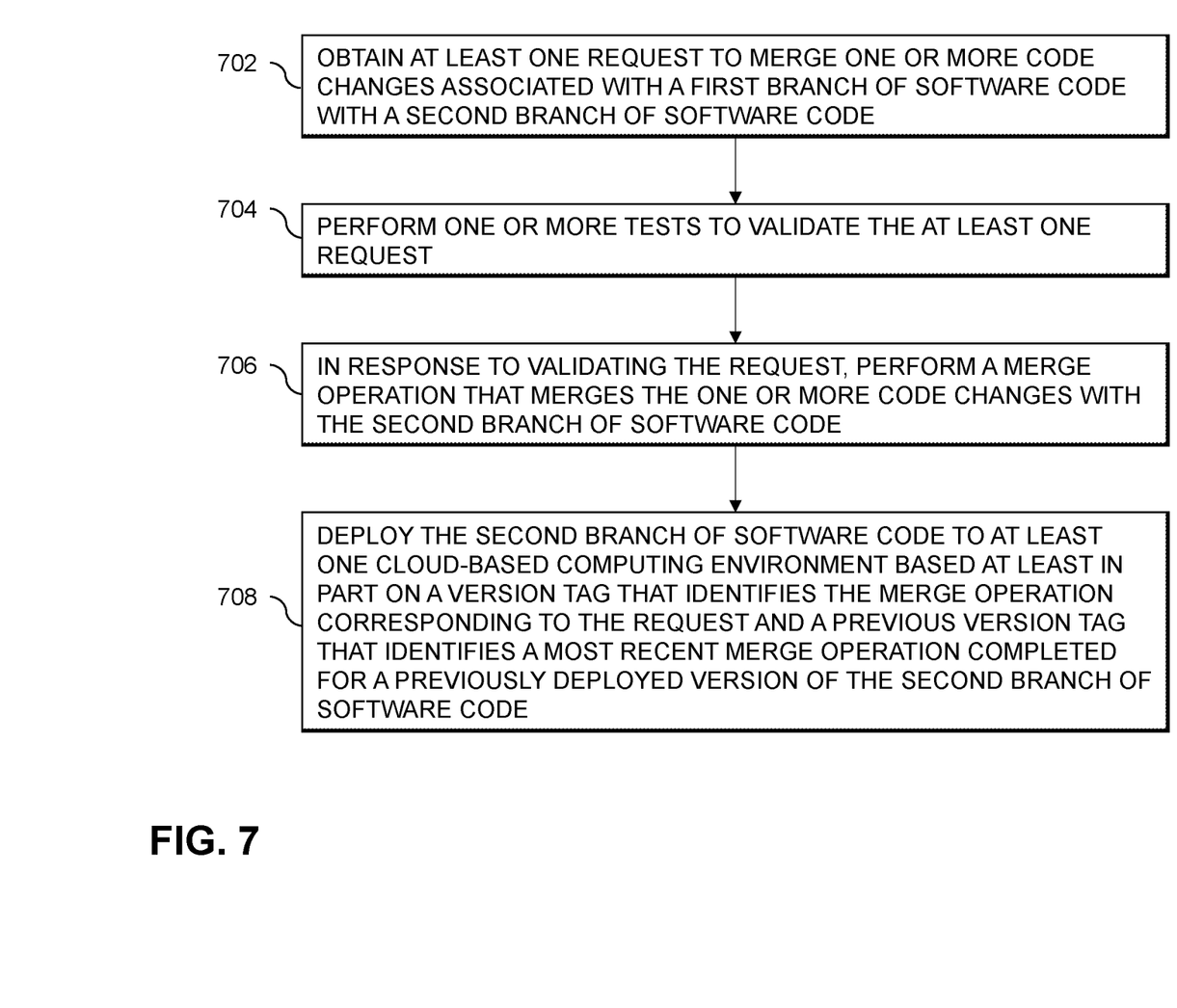
FIG. 7 shows an example of an automated software deployment process in an illustrative embodiment.

FIG. 7 is a flow diagram of a process for automated software deployment in an illustrative embodiment. It is to be understood that this particular process is only an example, and additional or alternative processes can be carried out in other embodiments.

In this embodiment, the process includes steps 702 through 708. These steps are assumed to be performed by the software deployment system 105 utilizing at least a portion of elements 120-126.

Step 702 includes obtaining at least one request to merge one or more code changes associated with a first branch of software code with a second branch of software code. Step 704 includes performing one or more tests to validate the at least one request. Step 706 includes, in response to validating the request, performing a merge operation that merges the one or more code changes with the second branch of software code. Step 708 includes deploying the second branch of software code to at least one cloud-based computing environment based at least in part on a version tag that identifies the merge operation corresponding to the request and a previous version tag that identifies a most recent merge operation completed for a previously deployed version of the second branch of software code.

The at least one request may be initiated by a user, and the one or more tests may validate the one or more code changes associated with the first branch against code changes of at least one merge operation completed between the merge operation identified by the previous version tag and the merge operation identified by the version tag. The one or more tests may include at least one of: a security review test to determine whether the one or more code changes associated with the at least one request affect at least one user access permission; and one or more automated unit tests. In response to determining that the one or more code changes associated with the at least one request affect at least one user access permission, the validating may further include:

automatically sending an approval request to at least one specified user. The process may further include automatically sending a notification to a user that initiated the at least one request, and the notification may include information related to one or more errors resulting from the one or more automated unit tests. The at least one cloud-based computing environment may include a non-production computing environment. The at least one cloud-based computing environment may include a production computing environment, and the deploying may include generating a file comprising a list of names and components included in the second branch of software code that is currently being deployed. The process may include performing a rollback to the previously deployed version of the second branch of software code, wherein performing the rollback comprises: (i) retrieving the previously deployed version of the software code using the list of names and components in the file; (ii) deploying the previously deployed version of the software code to the production computing environment; and (iii) deleting any item included in the list of names and components that was not retrieved. The deploying may include: using the version tag and the previous version tag to identify code differences between: (i) the second branch of software code following the merge operation and (ii) the previously deployed version of the second branch; and deploying the code differences to the at least one cloud-based computing environment.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve conventional automated software deployment techniques. These and other embodiments can effectively overcome problems associated with conventional techniques that result in large deployment package sizes, long execution times to deploy such packages, and deployment errors resulting from missing or incorrect code across different environments. For example, some embodiments are configured to implement automated software deployment techniques and tools that enable automated deployment to multiple environments in a fast and efficient manner, while also helping to reduce deployment errors. Additionally, at least some embodiments provide complete rollback support, as well as improved tools for retrofitting code and communicating issues to developers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines.

The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
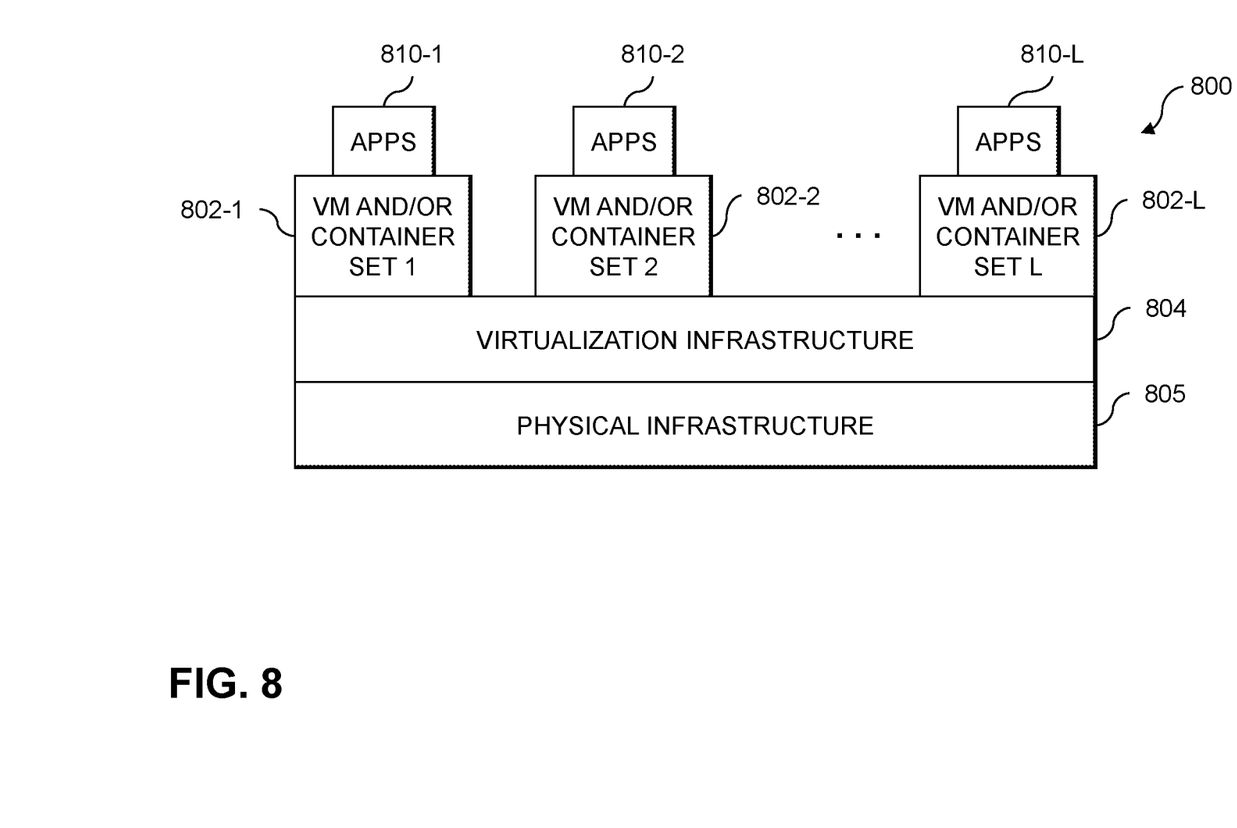
FIGS. 8 and 9 show examples of processing platforms that may be utilized to implement at least a portion of an information processing system in illustrative embodiments.
Figure 9:
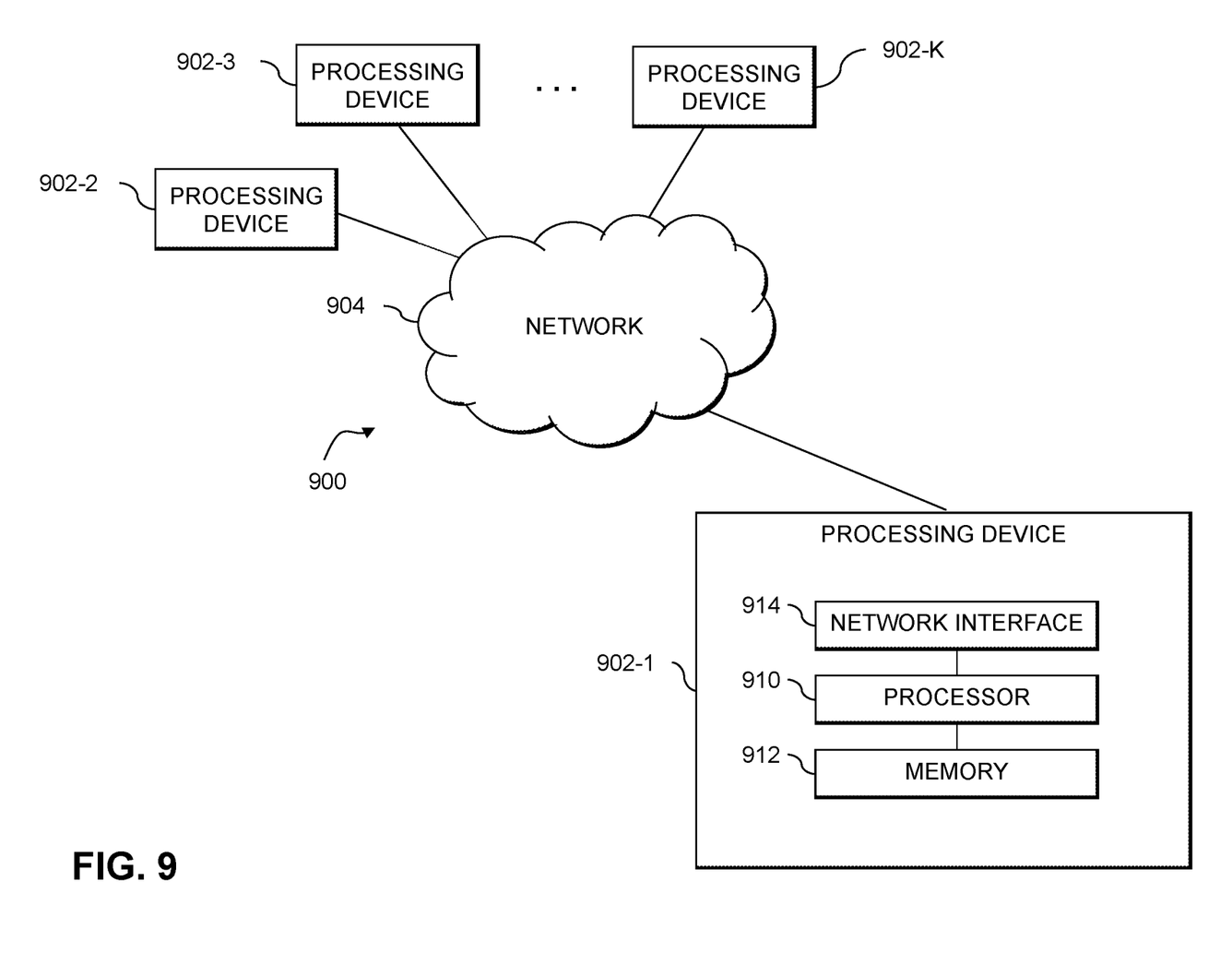

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system. The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an ASIC), an FPGA or other type of processing circuitry, as well as portions or combinations of such circuitry elements.

The memory 912 comprises RAM, ROM or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining at least one request to merge one or more code changes associated with a first branch of software code with a second branch of software code, wherein the one or more code changes associated with the first branch of software code are deployed in at least one first cloud-based computing environment, and wherein the second branch of software code is deployed in at least one second cloud-based computing environment that is different than the at least one first cloud-based computing environment;
performing one or more tests to validate the at least one request;
in response to validating the request, performing a merge operation that merges the one or more code changes with the second branch of software code; and
deploying the second branch of software code to the at least one first cloud-based computing environment based at least in part on a first version tag that identifies the deployment of the one or more code changes to the first branch of software and a second version tag that identifies a most recent merge operation completed for a version of the second branch of software code previously deployed in the at least one second cloud-based computing environment;
wherein the method is performed by at least one processing device comprising a processor coupled to a memory.

2. The computer-implemented method of claim 1, wherein the at least one request is initiated by a user, and wherein the one or more tests validate the one or more code changes associated with the first branch of software code against code changes of at least one merge operation completed between the merge operation identified by the second version tag and the merge operation identified by the first version tag.

3. The computer-implemented method of claim 1, wherein the one or more tests comprise at least one of:
a security review test to determine whether the one or more code changes associated with the at least one request affect at least one user access permission; and
one or more automated unit tests.

4. The computer-implemented method of claim 3, wherein, in response to determining that the one or more code changes associated with the at least one request affect at least one user access permission, the validating further comprises automatically sending an approval request to at least one specified user.

5. The computer-implemented method of claim 3, comprising:
automatically sending a notification to a user that initiated the at least one request, wherein the notification comprises information related to one or more errors resulting from the one or more automated unit tests.

6. The computer-implemented method of claim 1, wherein the at least one second cloud-based computing environment comprises a non-production computing environment.

7. The computer-implemented method of claim 1, wherein the at least one first cloud-based computing environment comprises a production computing environment, and wherein the deploying comprises generating a file comprising a list of names and components included in the second branch of software code that is currently being deployed.

8. The computer-implemented method of claim 7, comprising:
performing a rollback to the version of the second branch of software code previously deployed in the at least one second cloud-based computing environment, wherein performing the rollback comprises: (i) retrieving the version of the software code previously deployed in the at least one second cloud-based computing environment using the list of names and components in the file; (ii) deploying the version of the software code previously deployed in the at least one second cloud-based computing environment to the production computing environment; and (iii) deleting any item included in the list of names and components that was not retrieved.

9. The computer-implemented method of claim 1, wherein the deploying comprises:
using the first version tag and the second version tag to identify code differences between: (i) the second branch of software code following the merge operation and (ii) the version of the second branch previously deployed in the at least one second cloud-based computing environment; and
deploying the code differences to the at least one first cloud-based computing environment.

10. The method of claim 9, further comprising:
generating, in response to successfully deploying the second branch of software code to the at least one first cloud-based computing environment, at least one notification based at least in part on the first version tag and the second version tag, wherein the at least one notification comprises a list of one or more users associated with the identified code differences.

11. A non-transitory processor-readable storage medium having stored therein program code of one or more software programs, wherein the program code when executed by at least one processing device causes the at least one processing device:
to obtain at least one request to merge one or more code changes associated with a first branch of software code with a second branch of software code, wherein the one or more code changes associated with the first branch of software code are deployed in at least one first cloud-based computing environment, and wherein the second branch of software code is deployed in at least one second cloud-based computing environment that is different than the at least one first cloud-based computing environment;
to perform one or more tests to validate the at least one request;
in response to validating the request, to perform a merge operation that merges the one or more code changes with the second branch of software code; and
to deploy the second branch of software code to the at least one first cloud-based computing environment based at least in part on a first version tag that identifies the deployment of the one or more code changes to the first branch of software and a second version tag that identifies a most recent merge operation completed for a version of the second branch of software code previously deployed in the at least one second cloud-based computing environment.

12. The non-transitory processor-readable storage medium of claim 11, wherein the at least one request is initiated by a user, and wherein the one or more tests validate the one or more code changes associated with the first branch of software code against code changes of at least one merge operation completed between the merge operation identified by the second version tag and the merge operation identified by the first version tag.

13. The non-transitory processor-readable storage medium of claim 11, wherein the one or more tests comprise at least one of:
a security review test to determine whether the one or more code changes associated with the at least one request affect at least one user access permission; and
one or more automated unit tests.

14. The non-transitory processor-readable storage medium of claim 13, wherein, in response to determining that the one or more code changes associated with the at least one request affect at least one user access permission, the validating further comprises automatically sending an approval request to at least one specified user.

15. The non-transitory processor-readable storage medium of claim 13, wherein the program code further causes the at least one processing device:
to automatically send a notification to a user that initiated the at least one request, wherein the notification comprises information related to one or more errors resulting from the one or more automated unit tests.

16. The non-transitory processor-readable storage medium of claim 11, wherein at least one of:
the at least one second cloud-based computing environment comprises a non-production computing environment; and
the at least one first cloud-based computing environment comprises a production computing environment, wherein the deploying comprises generating a file comprising a list of names and components included in the second branch of software code that is currently being deployed.

17. An apparatus comprising:
at least one processing device comprising a processor coupled to a memory;
the at least one processing device being configured:
to obtain at least one request to merge one or more code changes associated with a first branch of software code with a second branch of software code, wherein the one or more code changes associated with the first branch of software code are deployed in at least one first cloud-based computing environment, and wherein the second branch of software code is deployed in at least one second cloud-based computing environment that is different than the at least one first cloud-based computing environment;
to perform one or more tests to validate the at least one request;
in response to validating the request, to perform a merge operation that merges the one or more code changes with the second branch of software code; and
to deploy the second branch of software code to the at least one first cloud-based computing environment based at least in part on a first version tag that identifies the deployment of the one or more code changes to the first branch of software and a second version tag that identifies a most recent merge operation completed for a version of the second branch of software code previously deployed in the at least one second cloud-based computing environment.

18. The apparatus of claim 17, wherein the at least one request is initiated by a user, and wherein the one or more tests validate the one or more code changes associated with the first branch of software code against code changes of at least one merge operation completed between the merge operation identified by the second version tag and the merge operation identified by the first version tag.

19. The apparatus of claim 17, wherein the one or more tests comprise at least one of:
a security review test to determine whether the one or more code changes associated with the at least one request affect at least one user access permission; and
one or more automated unit tests.

20. The apparatus of claim 19, wherein, in response to determining that the one or more code changes associated with the at least one request affect at least one user access permission, the validating further comprises automatically sending an approval request to at least one specified user.

* * * * *